UNITED STATES PATENT OFFICE.

JOSEF ZIEGLER, OF BIEBRICH, GERMANY, ASSIGNOR TO ADOLF LEMBACH AND ULRICH SCHLEICHER, OF SAME PLACE, AND C. F. WOLFF, OF WIESBADEN, GERMANY.

PROCESS OF PREPARING OXYCHINOLINE SULPHATE.

SPECIFICATION forming part of Letters Patent No. 466,708, dated January 5, 1892.

Application filed May 20, 1891. Serial No. 393,486. (Specimens.)

*To all whom it may concern:*

Be it known that I, JOSEF ZIEGLER, of Biebrich, in the Kingdom of Prussia and German Empire, have invented a new Process for the Production of the Neutral Sulphate of Ortho-Oxychinoline, of which the following is a specification.

This invention relates to a process for the production of the neutral sulphate of ortho-oxychinoline.

Twenty kilos of orthoamidophenol-parasulphonic acid,

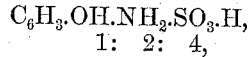

fourteen kilos of orthonitrophenol-parasulphonic acid,

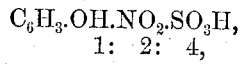

forty kilos of glycerine of 27° to 28° Baumé, and fifty kilos of sulphuric acid of 59° to 60° Baumé are boiled together for about six to ten hours in a vessel provided with a reverse condenser. The product of the reaction is then allowed to run into two hundred liters of water constantly stirred and the oxychinoline precipitated by soda. The liquid is then filtered off, and the product collected is purified by distillation with steam. Twenty-nine kilos of the oxychinoline obtained in this way are now boiled for about six hours with ten kilos of sulphuric acid of 66° Baumé and thirty kilos of water in a vessel also provided with a reverse condenser. The water is eventually removed from the product of the reaction by distillation in vacuum. Neutral sulphate of oxychinoline crystallizes out in fine crystals of a sulphur-yellow color, melting at 172° to 173°. This substance dissolves very easily in water. Its chemical constitution is expressed by the following formula:

This substance possesses a very powerful anti-bacterial effect and is considered to be of the greatest importance for medical, surgical, and hygienic purposes.

What I claim, and desire to secure by Letters Patent of the United States, is—

A process for the preparation of the sulphate of ortho-oxychinoline, consisting in the formation of ortho-oxychinoline by boiling orthoamidophenol-parasulphonic acid,

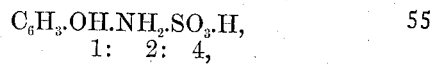

with orthonitrophenol-parasulphonic acid and with glycerine and sulphuric acid, precipitating from the product of the reaction by means of soda the oxychinoline thus formed and purifying the same, and subsequently heating the oxychinoline thus obtained with sulphuric acid in the proportion of two molecules of the former to one of the latter until the chemical combination of the two bodies is complete, substantially as described.

In witness whereof I have hereunto set my hand in presence of two witnesses.

JOSEF ZIEGLER.

Witnesses:
JEAN GRUND,
FRANK H. MASON.